(12) United States Patent
Watanabe et al.

(10) Patent No.: US 11,846,647 B2
(45) Date of Patent: Dec. 19, 2023

(54) INERTIAL MEASUREMENT UNIT

(71) Applicant: Seiko Epson Corporation, Tokyo (JP)

(72) Inventors: Jun Watanabe, Matsumoto (JP); Kenta Sato, Shiojiri (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/477,589

(22) Filed: Sep. 17, 2021

(65) Prior Publication Data
US 2022/0091153 A1    Mar. 24, 2022

(30) Foreign Application Priority Data

Sep. 18, 2020   (JP) ................................ 2020-157106

(51) Int. Cl.
| | |
|---|---|
| *G01P 15/08* | (2006.01) |
| *G01P 3/44* | (2006.01) |
| *G01P 15/18* | (2013.01) |
| *G01P 1/02* | (2006.01) |
| *G01P 1/00* | (2006.01) |
| *G01C 19/5783* | (2012.01) |

(52) U.S. Cl.
CPC .......... *G01P 15/08* (2013.01); *G01C 19/5783* (2013.01); *G01P 1/003* (2013.01); *G01P 1/023* (2013.01); *G01P 3/44* (2013.01); *G01P 15/18* (2013.01)

(58) Field of Classification Search
CPC .. G01P 1/023; G01P 1/02; G01P 1/003; G01P 1/026; G01P 15/08; G01P 15/18; G01C 19/5783
See application file for complete search history.

(56) References Cited

U.S. PATENT DOCUMENTS

| | | | | |
|---|---|---|---|---|
| 5,233,873 | A | * | 8/1993 | Mozgowiec ............ G01P 1/006 73/497 |
| 2007/0074570 | A1 | * | 4/2007 | Braman ................. G01C 21/16 73/504.14 |
| 2010/0089155 | A1 | * | 4/2010 | Sugihara ................ G01C 21/16 73/497 |
| 2013/0175424 | A1 | | 7/2013 | Shimada et al. |
| 2017/0191832 | A1 | * | 7/2017 | Kinoshita ............. B81B 7/0016 |
| 2019/0277873 | A1 | | 9/2019 | Sato |
| 2020/0057088 | A1 | * | 2/2020 | Lebron ............. G01C 19/5783 |

(Continued)

FOREIGN PATENT DOCUMENTS

| | | |
|---|---|---|
| CN | 103195864 A | 7/2013 |
| JP | 2002-250627 A | 9/2002 |

(Continued)

*Primary Examiner* — Helen C Kwok
(74) *Attorney, Agent, or Firm* — Harness, Dickey & Pierce, P.L.C.

(57) ABSTRACT

An inertial measurement unit includes: a sensor unit having an inertial sensor; and a first holding unit holding the sensor unit. The first holding unit includes: a first substrate; a second substrate; a plurality of spacers coupling the sensor unit and the first substrate; a first elastic member and a second elastic member provided on both sides of the first substrate via opening parts; a first fixing member penetrating, pressing and fixing the first substrate and the first elastic member to the second substrate; and a second fixing member penetrating, pressing and fixing the first substrate and the second elastic member to the second substrate.

9 Claims, 6 Drawing Sheets

(56) References Cited

U.S. PATENT DOCUMENTS

| | | | | |
|---|---|---|---|---|
| 2020/0371129 A1* | 11/2020 | Kobayashi | .............. | G01P 1/023 |
| 2021/0095961 A1* | 4/2021 | Sato | ...................... | G06F 3/0346 |
| 2021/0096150 A1 | 4/2021 | Sato et al. | | |
| 2021/0165010 A1* | 6/2021 | Yoda | ........................ | G01P 15/02 |
| 2021/0197836 A1* | 7/2021 | Kihara | ...................... | G01P 3/44 |
| 2022/0221487 A1* | 7/2022 | Takeda | .................... | G01P 15/18 |

FOREIGN PATENT DOCUMENTS

| | | |
|---|---|---|
| JP | 2005-180562 A | 7/2005 |
| JP | 2010-258734 A | 11/2010 |
| JP | 2011-085441 A | 4/2011 |
| JP | 2019-158863 A | 9/2019 |

\* cited by examiner

INERTIAL MEASUREMENT UNIT

The present application is based on, and claims priority from JP Application Serial Number 2020-157106, filed Sep. 18, 2020, the disclosure of which is hereby incorporated by reference herein in its entirety.

BACKGROUND

1. Technical Field

The present disclosure relates to an inertial measurement unit.

2. Related Art

An inertial measurement unit (IMU) having a plurality of sensors such as an angular velocity sensor and an acceleration sensor and used to measure an amount of displacement of a building, a structure or the like is known. In the structure of the related-art inertial measurement unit, accurate measurement data cannot be detected due to the propagation of a vibration from outside that is different from a detection target to the sensors. Therefore, the inertial measurement unit needs to have an anti-vibration structure.

For example, JP-A-2010-258734 discloses an oven-controlled crystal oscillator having an anti-vibration structure. According to JP-A-2010-258734, a sub substrate having the oven-controlled crystal oscillator installed thereat is fixed to a main substrate by a screw or the like with a gel bushing of an elastic material placed in the four corners of the sub substrate. In FIG. 4 of JP-A-2010-258734, the gel bushing is provided in such a way as to hold the sub substrate from above and below, and an upper part of the gel bushing is exposed at an upper surface of the sub substrate.

However, since the elastic material of the gel bushing or the like is provided in an exposed state at the upper surface of the sub substrate in the anti-vibration structure described in JP-A-2010-258734, this anti-vibration structure has a problem in that, when applied to an inertial measurement unit for outdoor use, the elastic material deteriorates due to exposure to sunlight, wind and rain, or sudden temperature change and therefore cannot achieve sufficient durability against vibration.

SUMMARY

According to an aspect of the present disclosure, an inertial measurement unit includes: a sensor unit having an inertial sensor; and a first holding unit holding the sensor unit. The first holding unit includes: a first substrate having a plurality of opening parts and arranged opposite the sensor unit; a second substrate arranged opposite the first substrate; a plurality of spacers located at an outermost periphery of the first substrate and coupling the sensor unit and the first substrate together; a first elastic member and a second elastic member provided on both sides of the first substrate via the opening parts; a first fixing member penetrating, pressing and fixing the first substrate and the first elastic member to the second substrate; and a second fixing member penetrating, pressing and fixing the first substrate and the second elastic member to the second substrate. The first elastic member and the second elastic member each have a first part arranged between the sensor unit and the first substrate, a second part opposite the first part and in contact with the second substrate, and a third part coupled to the second part and located inside the opening parts.

DESCRIPTION OF EXEMPLARY EMBODIMENTS

1. First Embodiment

A schematic configuration of an inertial measurement unit 1 according to a first embodiment will now be described with reference to FIGS. 1 to 4.

Figure 1:
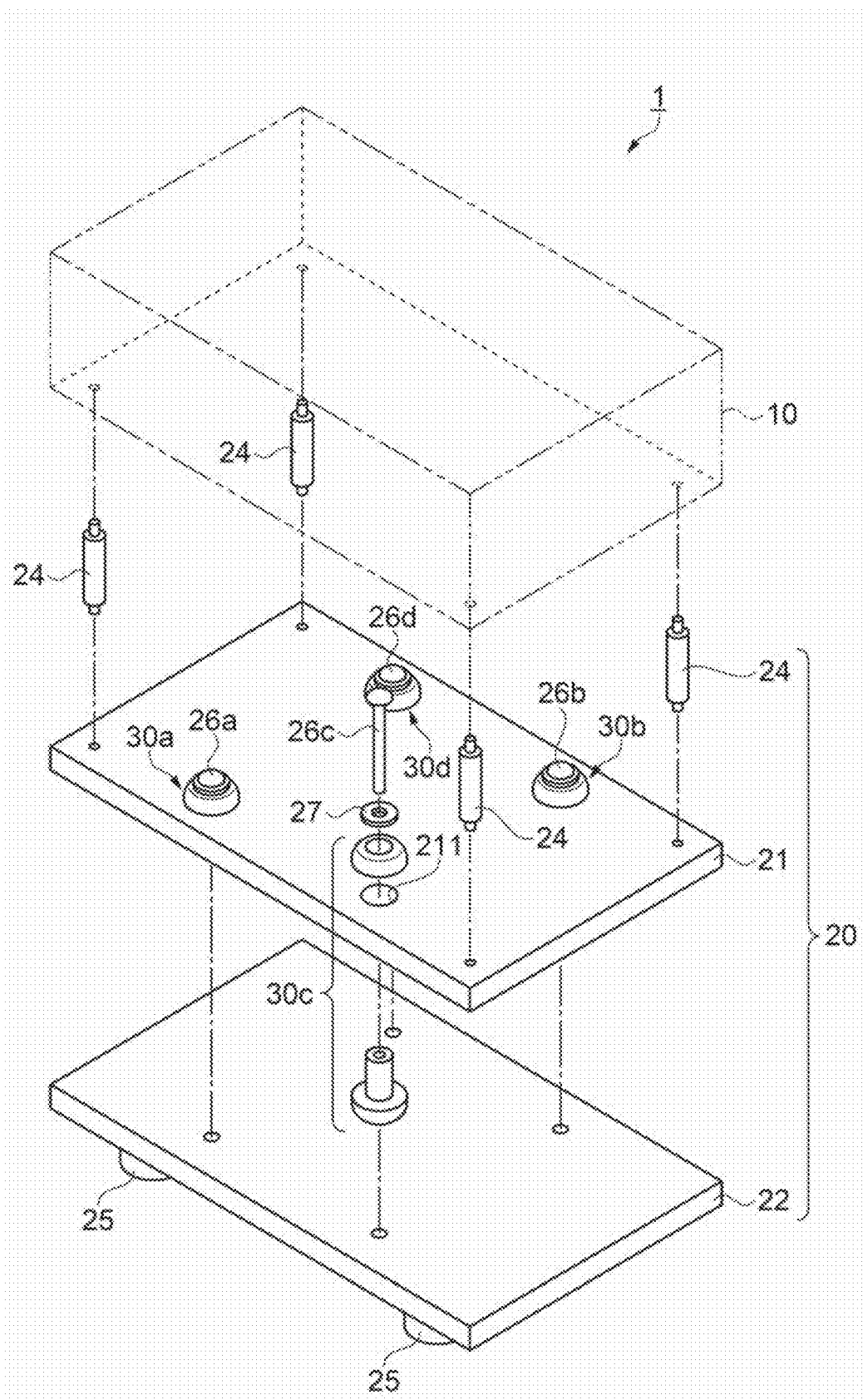
FIG. 1 is an exploded perspective view of an inertial measurement unit according to a first embodiment.
Figure 2:
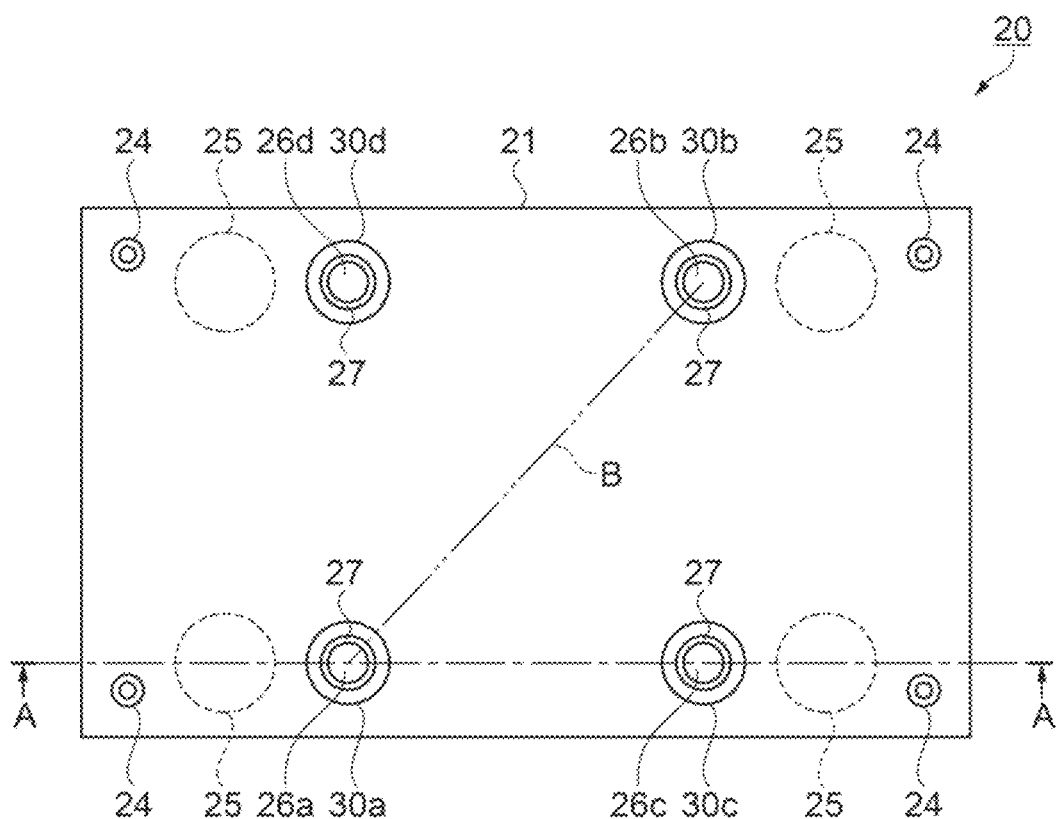
FIG. 2 is a schematic plan view of the inertial measurement unit in FIG. 1.
Figure 3:
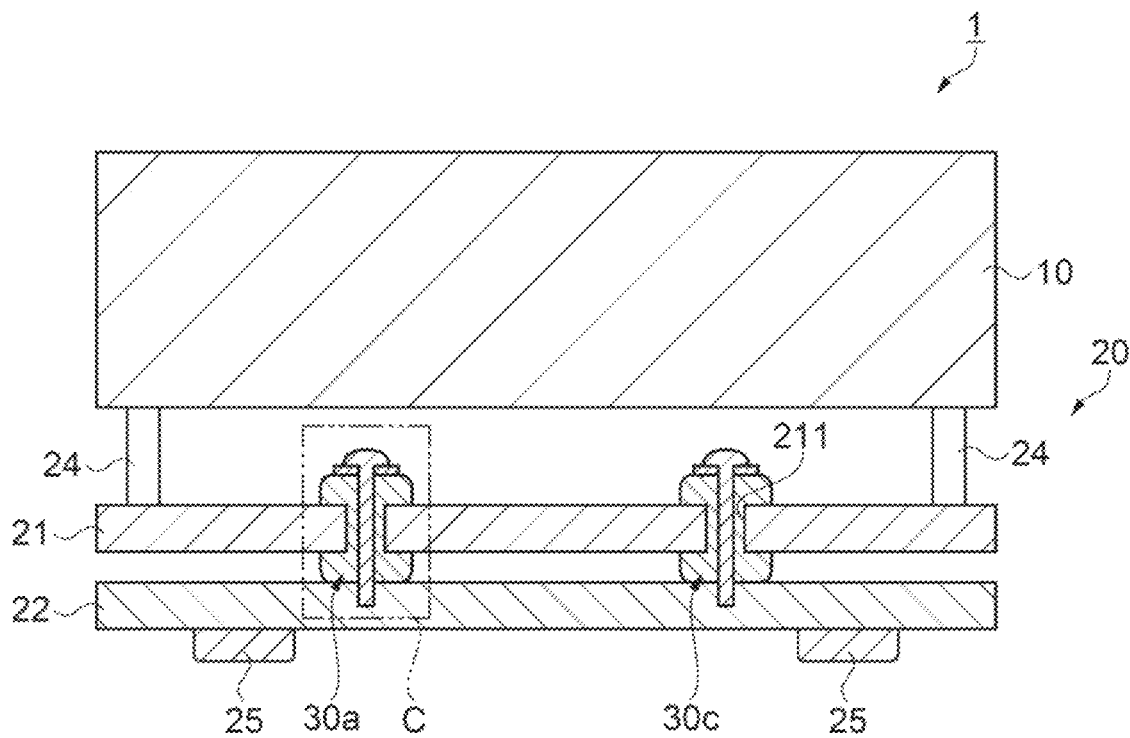
FIG. 3 is a cross-sectional view taken along a line A-A in FIG. 2.
Figure 4:
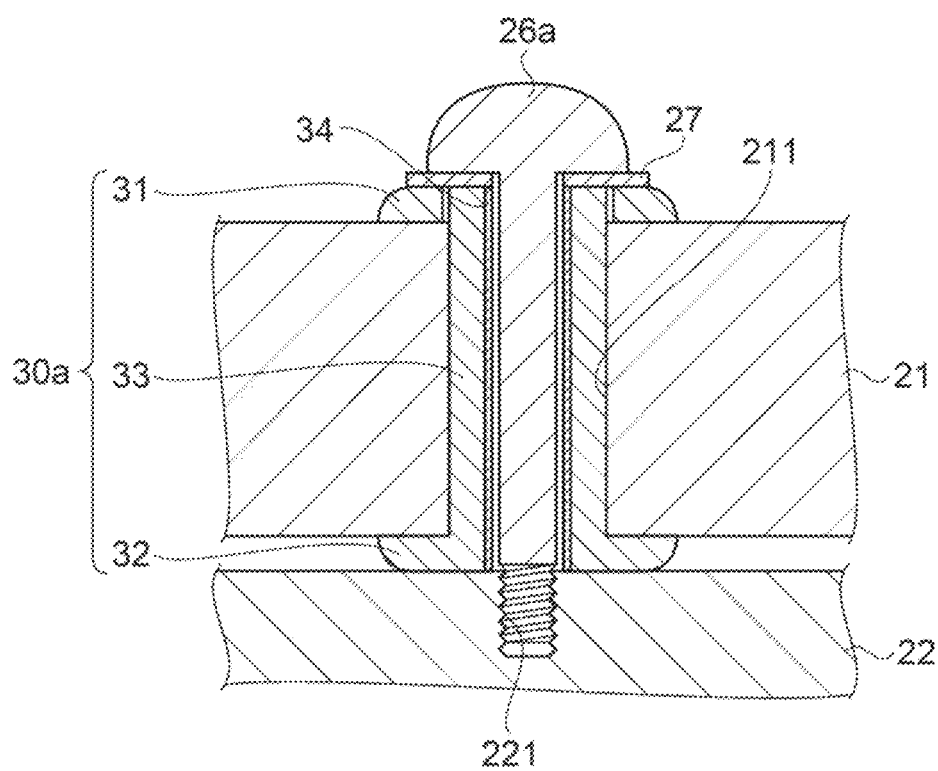
FIG. 4 is an enlarged view of a part C in FIG. 3.

FIG. 1 is an exploded perspective view showing a schematic structure of the inertial measurement unit 1 through a sensor unit 10. FIG. 2 is a plan view showing a schematic structure of the inertial measurement unit 1 in FIG. 1. In FIG. 2, the sensor unit 10 is omitted in order to make a first substrate 21 more visible from the side of the sensor unit 10. FIG. 3 is a cross-sectional view taken along a line A-A in FIG. 2. FIG. 4 is an enlarged cross-sectional view of a part C in FIG. 3.

As shown in FIG. 1, the inertial measurement unit 1 has a sensor unit 10 and a holding unit 20 holding the sensor unit 10.

The sensor unit 10 is a rectangular parallelepiped having a rectangular planar shape and has a three-axis acceleration sensor and a three-axis angular velocity sensor built inside as inertial sensors. The sensor unit 10 is provided with a connector, not illustrated, and is thus coupled to a control circuit.

As shown in FIGS. 1 and 2, the holding unit 20 has a first substrate 21 arranged and fixed opposite the sensor unit 10, a second substrate 22 arranged and fixed opposite the first substrate 21, four spacers 24 coupling the sensor unit 10 and the first substrate 21 together, gel bushings 30*a*, 30*b*, 30*c*, 30*d*, screws 26*a*, 26*b*, 26*c*, 26*d*, and four magnets 25. The holding unit 20 is equivalent to a first holding unit.

The first substrate 21 and the second substrate 22 are flat plate-like substrates made of aluminum and have a plurality of holes formed therein, including four opening parts 211. The surfaces of the first substrate 21, the second substrate 22, and the sensor unit 10 arranged opposite each other have the same shape and area. Therefore, when the first substrate 21 is arranged opposite the sensor unit 10 and the second substrate 22 is arranged opposite the first substrate 21, the sensor unit 10 is located in such a way as to cover one surface of the first substrate 21 with a predetermined distance and the first substrate 21 is located in such a way as to cover one surface of the second substrate 22 with a predetermined distance.

In this embodiment, aluminum is used for the first substrate 21 and the second substrate 22. However, this is not limiting. Other metals or ceramics or the like can be used. The first substrate 21 and the second substrate 22 preferably have a modulus of elasticity that is lower than the modulus of elasticity of the gel bushings 30a, 30b, 30c, 30d.

The sensor unit 10 and the first substrate 21 are coupled and fixed together by the four spacers 24. The spacers are located near the four corners forming an outermost periphery of the first substrate 21. The spacers 24 have the two ends thereof fixed in holes provided in the sensor unit 10 and the first substrate 21 and are fixed in such a way that the surfaces of the sensor unit 10 and the first substrate 21 face each other with a predetermined distance.

For the spacers 24, a metal or a resin material can be used. Preferably a metal is used. In this embodiment, aluminum is used for the spacers 24, similarly to the first substrate 21 and the second substrate 22.

As shown in FIG. 2, in the inertial measurement unit 1, the gel bushings 30a, 30c, the screws 26a, 26c, and two magnets 25 are provided, located between two spacers 24 along a long side of the first substrate 21. Also, the gel bushings 30b, 30d, the screws 26b, 26d, and two magnets 25 are provided, located between two spacers 24 along the other long side of the first substrate 21.

The gel bushings 30a, 30b, 30c, 30d are anti-vibration gels using α-gel and are elastic members that can eliminate micro-vibration propagating from outside and thus attenuate the frequency of a noise or the like picked up by the sensor. The gel bushing 30a is equivalent to a first elastic member. The gel bushing 30b is equivalent to a second elastic member. The gel bushing 30c is equivalent to a third elastic member. The gel bushing 30d is equivalent to a fourth elastic member.

The screws 26a, 26b, 26c, 26d are fixing members fixing the first substrate 21 to the second substrate 22. The screws 26a, 26b, 26c, 26d correspond to the gel bushings 30a, 30b, 30c, 30d, respectively. The length of the screws 26a, 26b, 26c, 26d enables the adjustment of the space between the first substrate 21 and the second substrate 22 and the amount of compression of the gel bushings 30a, 30b, 30c, 30d when pressed, and therefore enables the adjustment of the frequency to be attenuated. The screw 26a is equivalent to a first fixing member. The screw 26b is equivalent to a second fixing member. The screw 26c is equivalent to a third fixing member. The screw 26d is equivalent to a fourth fixing member.

In a plan view of the first substrate 21, four pairs formed of the gel bushings 30a, 30b, 30c, 30d and the screws 26a, 26b, 26c, 26d are arranged in the four corners of a square. However, the number of pairs of gel bushing and screw and the position of arrangement thereof are not limited to this example. Two pairs formed of the gel bushings 30a, 30b and the screws 26a, 26b arranged at diagonally opposite positions in the square may be employed. Alternatively, three pairs may be employed, including the gel bushing 30c and the screw 26c arranged at a position out of a straight line B connecting the gel bushings 30a, 30b, in addition to the two pairs formed of the gel bushings 30a, 30b and the screws 26a, 26b.

As shown in FIG. 3, the first substrate 21 is fixed to the second substrate 22 by the screws 26a, 26b, 26c, 26d penetrating the opening parts 211 and the gel bushings 30a, 30b, 30c, 30d.

The pairs formed of the gel bushings 30a, 30b, 30c, 30d and the screws 26a, 26b, 26c, 26d have the same configuration. Therefore, using the pair of the gel bushing 30a and the screw 26a as an example, the fixing between the first substrate 21 and the second substrate 22 will now be described.

The first substrate 21 and the second substrate 22 are fixed together by inserting the screw 26a in the gel bushing 30a arranged in the opening part 211, as shown in FIGS. 3 and 4.

Specifically, the gel bushing 30a has a first part 31 arranged between the sensor unit 10 and the first substrate 21, a second part 32 arranged opposite the first part 31 and in contact with the second substrate 22, and a third part 33 coupled to the second part 32 at one end side thereof and located inside the opening part 211. As the third part 33 is inserted in the opening part 211 and the first part 31 is engaged with the other end side of the third part 33, the gel bushing 30a is arranged in such a way as to hold the first substrate 21 from both sides via the opening part 211.

A penetration hole along the direction of extension of the third part 33 is provided in the middle of the gel bushing 30a. The screw 26a is inserted in this penetration hole. The screw 26a penetrates the first substrate 21 and the gel bushing 30a and has a distal end part thereof helically fitted and fixed in a screw hole 221 provided in the second substrate 22 while pressing the gel bushing 30a.

Similarly, the screw 26b penetrates the first substrate 21 and the gel bushing 30b and has a distal end part thereof helically fitted and fixed in a screw hole 221 provided in the second substrate 22 while pressing the gel bushing 30b. The first substrate 21 is thus fixed to the second substrate 22 by the screws 26a, 26b, 26c, 26d.

A washer 27 is arranged between a head part of the screw 26a and the gel bushing 30a. When the screw 26a is tightened, the washer 27 can uniformly press the gel bushing 30a.

A control member 34 is provided at an inner surface of the penetration hole provided in the gel bushing 30a. The control member 34 has a cylindrical shape surrounding a screw part of the screw 26a and is spaced apart from the screw 26a. As the control member 34 is arranged, the amount of pressing of the gel bushing 30a to the screw 26a can be controlled. The control member 34 is formed of a member having a higher rigidity than the gel bushing 30a and thus prevents the gel bushing 30a from being largely deformed and deteriorating in anti-vibration characteristic.

The four magnets 25 are provided at the surface of the second substrate 22 opposite to the side where the gel bushing 30a is provided. The four magnets 25 are located and screwed between the spacers 24 provided in the four corners of the first substrate 21 and the gel bushings 30a, 30b, 30c, 30d, as shown in FIG. 2. The four magnets 25 provided at the second substrate 22 enable the inertial measurement unit 1 to be installed on a casing of a measurement target device or building.

In the inertial measurement unit 1 according to this embodiment, the gel bushings 30a, 30b, 30c, 30d functioning as elastic members are arranged between the two spacers 24 and between the sensor unit 10 and the second substrate 22. Thus, even when the inertial measurement unit 1 is installed outdoors, the first part 31 of the gel bushings 30a, 30b, 30c, 30d is shielded from sunlight or wind and rain by the sensor unit 10 and therefore can be prevented from deteriorating due to exposure to ultraviolet rays, wind and rain, or sudden temperature change. These structures enable the provision of the inertial measurement unit 1 having a high anti-vibration function and a high detection accuracy in which the resonance of the inertial sensor due to an input vibration is damped.

In the inertial measurement unit 1, the first substrate 21 and the second substrate 22 have a modulus of elasticity that is lower than the modulus of elasticity of the gel bushings 30a, 30b, 30c, 30d. Therefore, the first substrate 21 and the second substrate 22 are not easily deformed and the strength of the pressing of the gel bushings 30a, 30b, 30c, 30d can be easily adjusted. As the amount of compression of the gel bushings 30a, 30b, 30c, 30d by pressing is controlled, the resonance frequency of the gel bushings 30a, 30b, 30c, 30d can be controlled to be uniform. This enables the provision of the inertial measurement unit 1 in which the resonance frequency of the gel bushings is controlled.

In the inertial measurement unit 1, the first substrate 21 and the second substrate 22 are formed of a metal or a ceramic and therefore do not easily deteriorate. Thus, the inertial measurement unit 1 can be installed regardless of the environment. Also, the inertial measurement unit 1 whose long-term reliability is high because of the low risk of malfunction due to deterioration can be provided.

The first substrate 21 and the second substrate 22 in the inertial measurement unit 1 are fixed together by the four pairs of the gel bushings 30a, 30b, 30c, 30d and the screws 26a, 26b, 26c, 26d. This can make the substrates less susceptible to the influence of rotational vibration. Even when the substrates are fixed together by three pairs of the gel bushings 30a, 30b, 30c and the screws 26a, 26b, 26c, if the gel bushing 30c and the screw 26c are provided at a position out of the straight line B, the first substrate 21 is supported at three points and can thus be made less susceptible to the influence of rotational vibration. When the substrates are fixed together by two pairs of the gel bushings 30a, 30b and the screws 26a, 26b, the number of components is reduced and the manufacturing cost can thus be reduced.

The gel bushings 30a, 30b, 30c, 30d in this embodiment are arranged in the four opening parts 211. However, this is not limiting. A plurality of opening parts 211 may be formed and the resonance frequency may be checked so that a gel bushing can be arranged at the most effect place. For example, eight opening parts 211 are provided and some places where the amount of damping of the resonance frequency is large are selected from the eight opening parts 211. The first substrate 21 and the second substrate 22 are fixed together by a gel bushing and a screw at these selected places. In this way, an arbitrary place can be selected from the plurality of opening parts 211. This enables the provision of the inertial measurement unit 1 in which the resonance of the inertial sensor due to an input vibration is damped.

2. Second Embodiment

A schematic configuration of an inertial measurement unit 1 and a holding unit 20a according to a second embodiment will now be described with reference to FIGS. 5 and 6. The same components as those in the foregoing embodiment are denoted by the same reference signs and the description thereof may be omitted.

Figure 5:
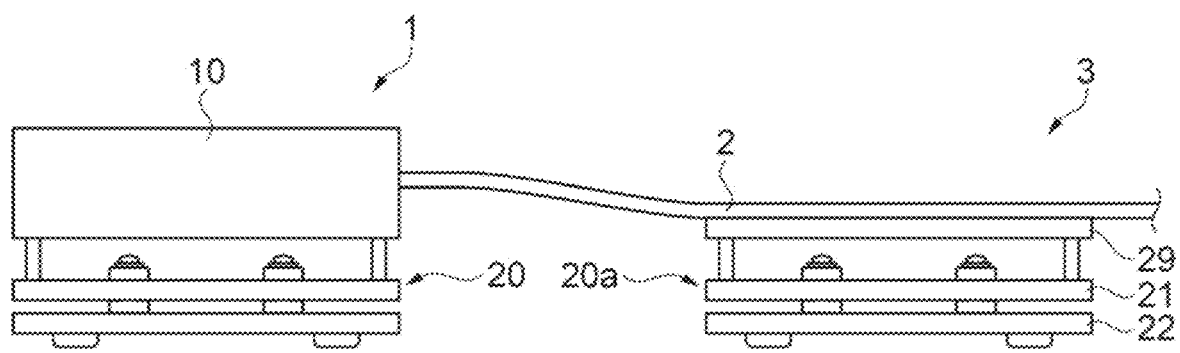
FIG. 5 shows a schematic structure of an inertial measurement unit and a holding unit according to a second embodiment.
Figure 6:
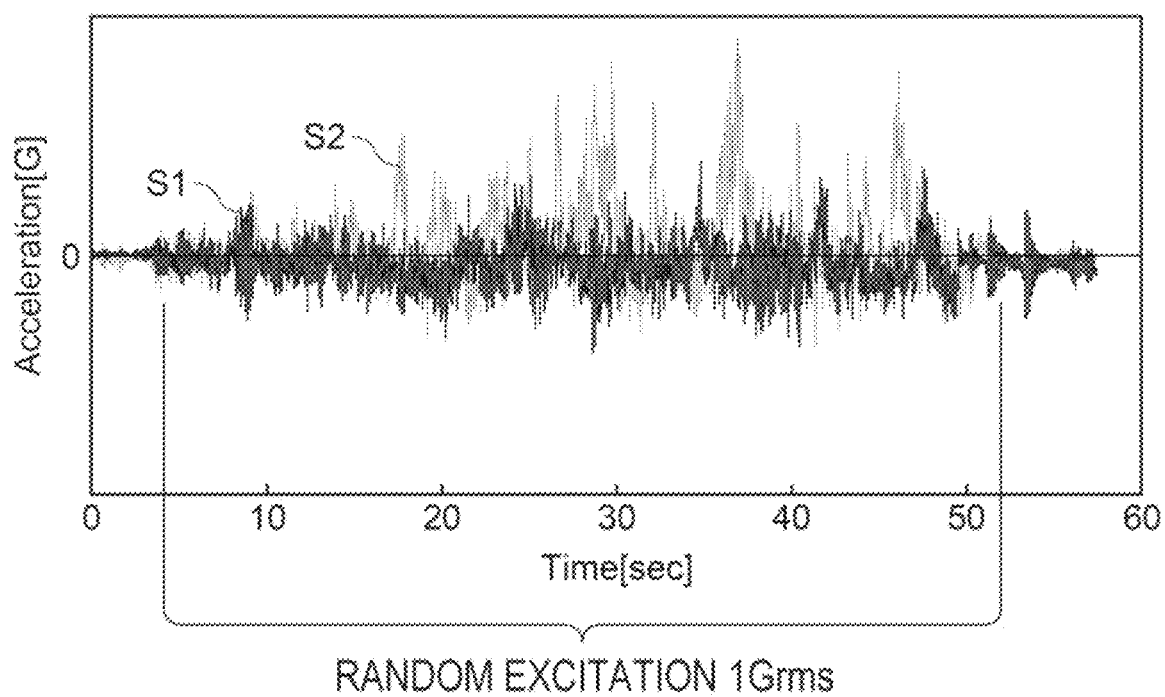
FIG. 6 is a graph showing a vibration characteristic resulting from vibration-proofing of a cable.

FIG. 5 shows a schematic structure of the inertial measurement unit 1 and the holding unit 20a according to the second embodiment. FIG. 6 is a graph showing a vibration characteristic of a cable 2 coupled to the inertial measurement unit 1.

As shown in FIG. 5, in the inertial measurement unit 1 according to the second embodiment, the cable 2 is coupled to the sensor unit 10. The cable 2 is supported by a plurality of support stands 3, not illustrated, and is thus fixed so as not to swing.

The inertial measurement unit 1 has the same configuration as in the above embodiment and therefore will not be described further in detail.

The cable 2 inputs and outputs a communication signal such as a control signal or a measurement signal to and from the inertial measurement unit 1 and supplies electric power to the inertial measurement unit 1.

The support stand 3 is formed of the holding unit 20a and a support substrate 29 held by the holding unit 20a. The holding unit 20a has the same configuration as the holding unit 20 and holds the support substrate 29 instead of the sensor unit 10. The holding unit 20a is equivalent to a second holding unit.

The support substrate 29 is a flat plate-like substrate made of aluminum and is arranged opposite the first substrate 21. The surfaces of the support substrate 29 and the first substrate 21 arranged opposite each other have the same shape and area. Therefore, the first substrate 21 of the holding unit 20a has one surface thereof covered by the support substrate 29 while maintaining a predetermined distance from the support substrate 29. At the surface of the support substrate 29 having a front-back relationship with the surface opposite the first substrate 21, the cable 2 is installed and fixed with an adhesive tape or the like, not illustrated.

The vibration characteristic due to the swing of the cable 2 will now be described. As shown in FIG. 6, a vibration characteristic S1 when the cable 2 is fixed to the support stand 3 has a smaller amplitude of vibration and less influence of vibration than a vibration characteristic S2 when the cable 2 is not fixed.

This means that, in the case of the vibration characteristic S2, since the cable 2 is not fixed and swings, the vibration thereof propagates to the sensor unit 10, thus causing a resonance noise to enter the measurement data of the inertial measurement unit 1. This also means that, in the case of the vibration characteristic S1, a resonance noise is prevented since the cable 2 is fixed to the support stand 3 and does not swing.

The support stand 3 having the cable 2 fixed thereto is provided with the holding unit 20a. Therefore, a vibration that is not a detection target, propagating from the place of installation of the support stand 3, can be prevented.

In the inertial measurement unit 1 and the holding unit 20a according to this embodiment, the cable 2 coupled to the sensor unit 10 is fixed to the support substrate 29 held by the holding unit 20a. Therefore, the vibration of the cable 2 is retrained and the resonant vibration of the cable 2 is less likely to propagate to the sensor unit 10. Also, since the gel bushings 30a, 30b, 30c, 30d are arranged between the support substrate 29 and the second substrate 22, the first part 31 of the gel bushings 30a, 30b, 30c, 30d is shielded by the support substrate 29 and can thus be prevented from deteriorating due to exposure to sunlight, wind and rain, or sudden temperature change. These structures enable the provision of the inertial measurement unit 1 having a high anti-vibration function and a high detection accuracy.

In this embodiment, the inertial measurement unit 1 having the cable 2 is described. However, when wireless communication is employed, a power supply cable is coupled to the sensor unit 10 and to a battery. The battery is fixed to the holding unit 20a or the support substrate 29 held by the holding unit 20a and thus installed near the inertial measurement unit 1. This can achieve an effect similar to that of the cable 2.

3. Third Embodiment

Figure 7:
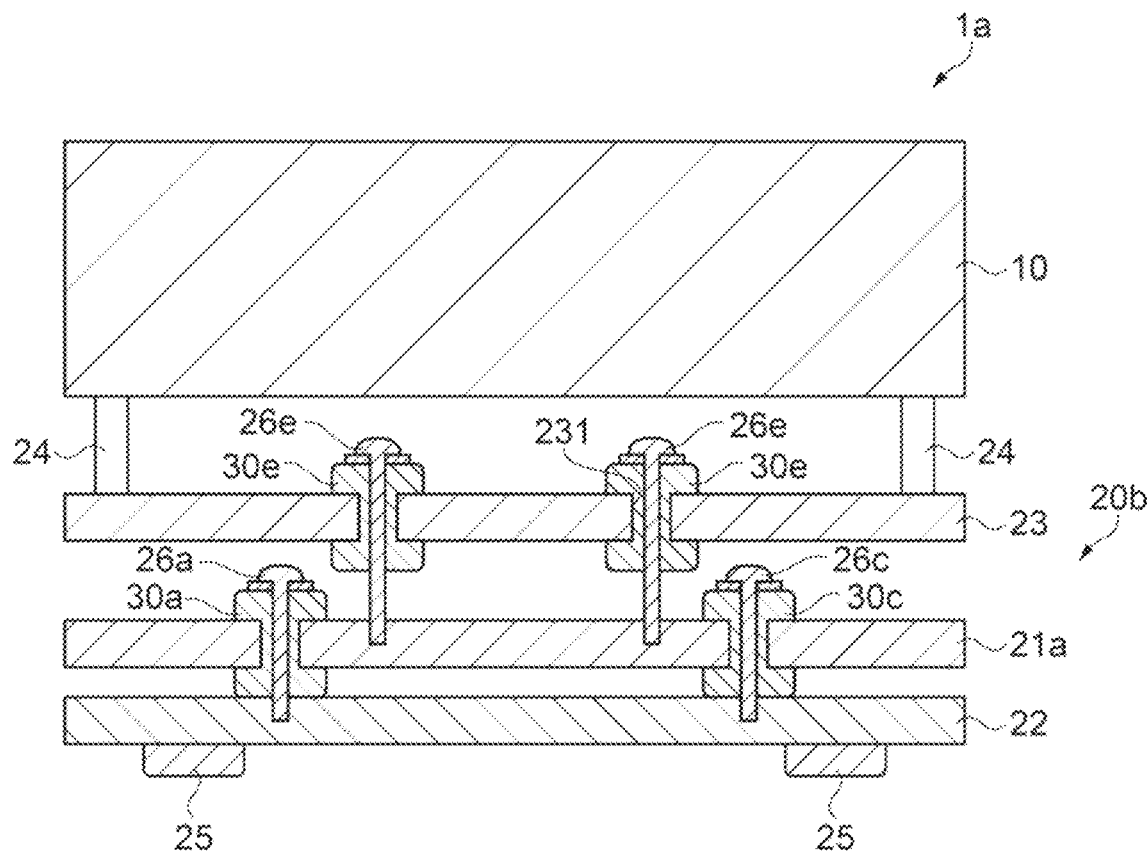
FIG. 7 is a schematic cross-sectional view of an inertial measurement unit according to a third embodiment.

A schematic configuration of an inertial measurement unit 1a according to a third embodiment will now be described with reference to FIG. 7. The same components as those in the foregoing embodiments are denoted by the same reference signs and the description thereof may be omitted. FIG. 7 is a cross-sectional view showing a schematic structure of the inertial measurement unit 1a.

The inertial measurement unit 1a has the sensor unit 10 and a holding unit 20b holding the sensor unit 10. The sensor unit 10 has the same configuration as in the foregoing embodiments and therefore will not be described further in detail.

The holding unit 20b of the inertial measurement unit 1a has a first substrate 21a instead of the first substrate 21 of the holding unit 20. The holding unit 20b has a third substrate 23, four gel bushings 30e, and four screws 26e in addition to the configuration of the holding unit 20.

The third substrate 23 is a flat plate-like substrate made of aluminum and has a plurality of holes formed therein, including four opening parts 231. The third substrate 23 is arranged opposite the sensor unit 10 and fixed by the spacers 24 located in the four corners on the outermost periphery. The surfaces of the third substrate 23 and the sensor unit 10 arranged opposite each other have the same shape and area. Therefore, the sensor unit 10 is located in such a way as to cover one surface of the third substrate 23 with a predetermined distance.

The first substrate 21a is opposite the third substrate 23 and has screw holes formed in the surface opposite the third substrate 23, in addition to the configuration of the first substrate 21.

The four gel bushings 30e are provided in such a way as to hold the third substrate 23 from both sides via the opening parts 231, and the four screws 26e penetrating the third substrate 23 and the gel bushings 30e are helically fitted in the screw holes formed in the first substrate 21a, thus fixing the third substrate 23. The four gel bushings 30e have a configuration similar to that of the gel bushings 30a, 30b, 30c, 30d and therefore will not be described further in detail.

In the inertial measurement unit 1a, when viewed from the side of the sensor unit 10, the gel bushings 30a, 30c holding the first substrate 21a from both sides, two gel bushings 30e holding the third substrate 23 from both sides, the screws 26a, 26c, and two screws 26e are provided in such a way as to be located between two spacers 24 along a long side of the first substrate 21a. Also, the gel bushings 30b, 30d holding the first substrate 21a from both sides, two gel bushings 30e holding the third substrate 23 from both sides, the screws 26b, 26d, and two screws 26e are provided in such a way as to be located between two spacers 24 along the other long side of the first substrate 21a. Specifically, the gel bushings 30e are located between the two gel bushings 30a, 30c and between the gel bushings 30b, 30d along the long sides.

In the inertial measurement unit 1a according to this embodiment, because of the first substrate 21a provided with the gel bushings 30a, 30b, 30c, 30d and the third substrate 23 provided with the gel bushings 30e, the anti-vibration function is twice higher and the amount of noise damping is a squared value. This enables the provision of the inertial measurement unit 1a having a high anti-vibration function and a high detection accuracy in which the resonance of the inertial sensor due to an input vibration is damped.

4. Fourth Embodiment

Figure 8:
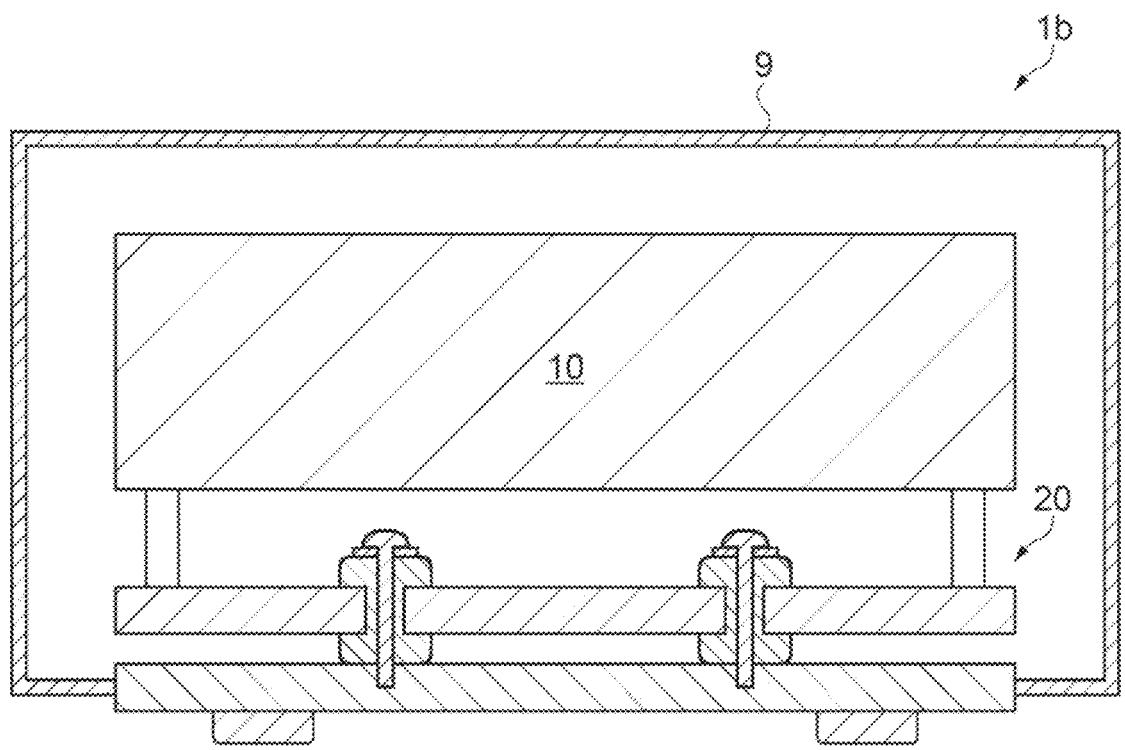
FIG. 8 is a schematic cross-sectional view of an inertial measurement unit according to a fourth embodiment.

A schematic configuration of an inertial measurement unit 1b according to a fourth embodiment will now be described with reference to FIG. 8. The same components as those in the foregoing embodiments are denoted by the same reference signs and the description thereof may be omitted. FIG. 8 is a schematic cross-sectional view of the inertial measurement unit 1b and corresponds to FIG. 3.

The inertial measurement unit 1b has the sensor unit 10, the holding unit 20 holding the sensor unit 10, and a cover 9. The sensor unit 10 and the holding unit 20 have the same configuration as in the foregoing embodiments and therefore will not be described further in detail.

The cover 9 is removably fixed to the holding unit 20 and contains the sensor unit 10 and the holding unit 20.

Since the inertial measurement unit 1b according to this embodiment has the cover 9, the sensor unit 10 is less susceptible to the influence of external heat. Also, since the cover 9 is provided at the holding unit 20, a vibration of the cover 9 is damped by the holding unit 20 and does not easily propagate to the sensor unit 10. Thus, change in output from the sensor due to temperature change can be restrained. This enables the provision of the inertial measurement unit 1b in which the performance of the sensor is improved while a vibration is damped.

Although the cover 9 is fixed to the holding unit 20 in this embodiment, the holding unit 20b may be provided instead of the holding unit 20.

5. Fifth Embodiment

Figure 9:
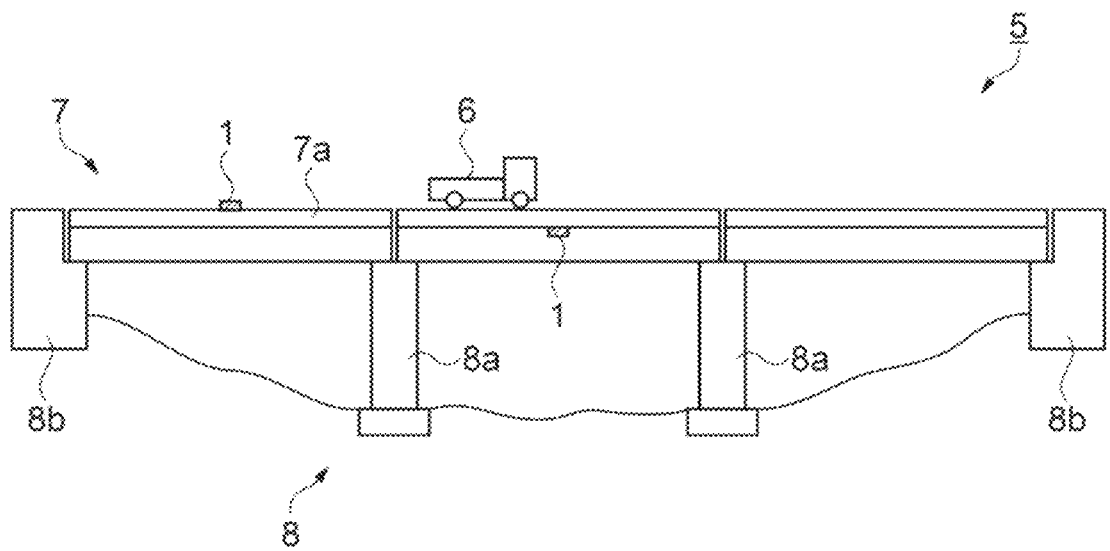
FIG. 9 shows an example of installation of an inertial measurement unit according to a fifth embodiment.
Figure 10:
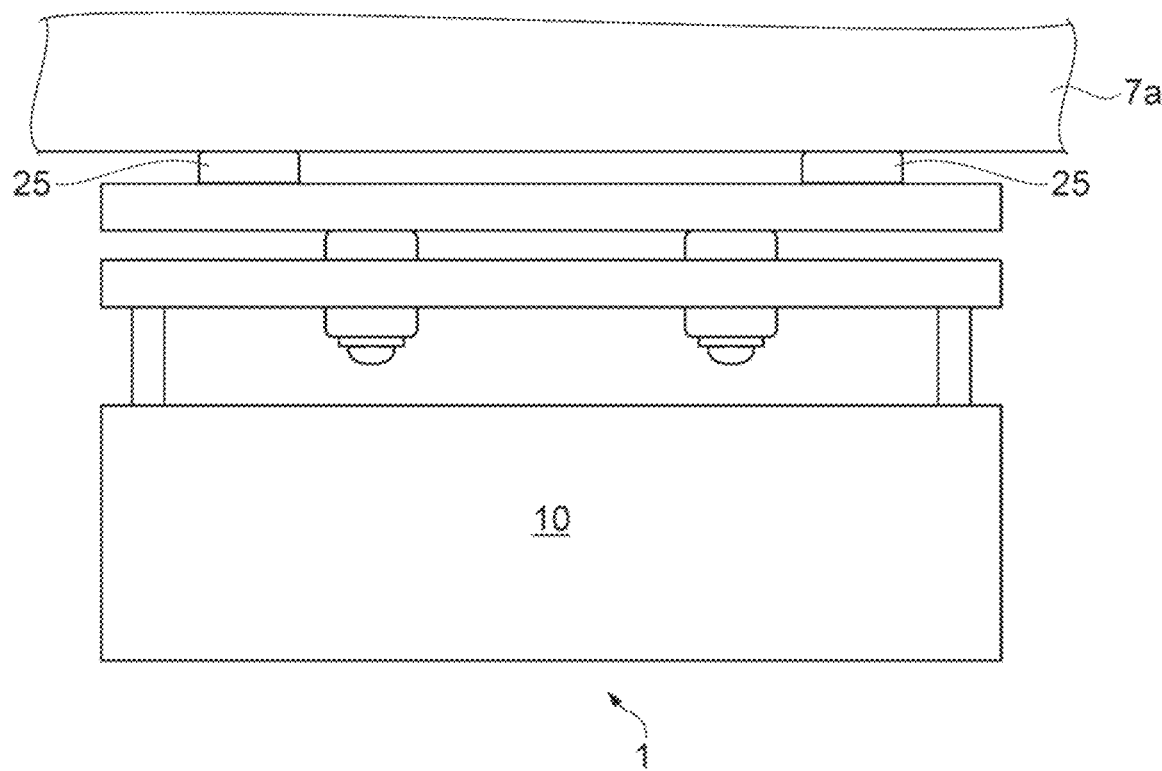
FIG. 10 shows an example of installation attitude of an inertial measurement unit.

The installation of the inertial measurement unit 1 at a structure will now be described with reference to FIGS. 9 and 10. FIG. 9 shows an example of installation of the inertial measurement unit. FIG. 10 shows an example of installation attitude of the inertial measurement unit.

As shown in FIG. 9, the inertial measurement unit 1 is installed at a bridge 5, which is a structure, and can measure an amount of flexure or the like of the bridge 5 generated by a passing vehicle 6, as an amount of displacement.

The bridge 5 is formed of an upper structure 7 and a lower structure 8. The upper structure 7 includes three deck boards 7a. The lower structure 8 includes a bridge pier 8a and a bridge abutment 8b. The three deck boards 7a are a structure laid between the bridge abutment 8b and the bridge pier 8a that are next to each other, or between two bridge piers 8a.

The inertial measurement unit 1 is installed at the bridge 5 with the magnets 25 attached to an upper surface or a lower surface of the deck board 7a by an attraction force thereof. As shown in FIG. 10, for example, by attaching the magnets 25 to the lower surface of the deck board 7a, the inertial measurement unit 1 can be installed at the deck board 7a in such an attitude that the sensor unit 10 comes downward.

According to the installation of the inertial measurement unit 1 at the structure as described above, the inertial measurement unit 1 can be installed by the attraction force of the magnets 25 regardless of the attitude thereof. Even when the inertial measurement unit 1 is installed regardless of the attitude thereof, the gel bushings 30a, 30b, 30c, 30d in the inertial measurement unit 1 are shielded and therefore can be prevented from deteriorating due to exposure to sunlight, wind and rain, or sudden temperature change. This enables the provision of the inertial measurement unit 1 having a high anti-vibration function and a high detection accuracy in which the resonance of the inertial sensor due to an input vibration is damped.

Since the inertial measurement unit 1 is installed by the attraction force of the magnets 25, the inertial measurement unit 1 is less likely to damage the structure and can more easily be installed and removed than when the inertial measurement unit 1 is installed with screws or an adhesive. Thus, the range of options for the installation place is expanded and measurement on a structure or building can be performed more easily.

What is claimed is:

1. An inertial measurement unit comprising:
   a sensor unit having an inertial sensor therein;
   a first substrate disposed below the sensor unit, a top surface of the first substrate facing a bottom surface of the sensor unit, the first substrate having a first plurality of openings therein, first, second, third, and fourth openings of the first plurality of openings being located at four corners of a virtual rectangle on the first substrate;
   a first plurality of spacers located at an outermost periphery of the top surface of the first substrate and coupling the sensor unit and the first substrate together;
   a second substrate disposed below the first substrate, a top surface of the second substrate facing a bottom surface of the first substrate;
   four attaching magnets disposed on a bottom surface of the second substrate and attaching the inertial measurement unit to a measurement target;
   a first elastic member provided on both the top and bottom surfaces of the first substrate via the first opening;
   a second elastic member provided on both the top and bottom surfaces of the first substrate via the second opening;
   a third elastic member provided on both the top and bottom surfaces of the first substrate via the third opening;
   a fourth elastic member provided on both the top and bottom surfaces of the first substrate via the fourth opening;
   a first fixing member penetrating, pressing and fixing the first substrate and the first elastic member to the second substrate via the first opening;
   a second fixing member penetrating, pressing and fixing the first substrate and the second elastic member to the second substrate via the second opening;
   a third fixing member penetrating, pressing and fixing the first substrate and the third elastic member to the second substrate via the third opening; and
   a fourth fixing member penetrating, pressing and fixing the first substrate and the fourth elastic member to the second substrate via the fourth opening,
   wherein each of the first, second, third, and fourth elastic members has a first part arranged between the sensor unit and the first substrate, a second part located between the first substrate and the second substrate, and a third part coupled to the second part and located inside one of the first, second, third, and fourth openings,
   a distance between the bottom surface of the sensor unit and the top surface of the first substrate is larger than a distance between the bottom surface of the first substrate and the top surface of the second substrate,
   first and second magnets of the four attaching magnets are respectively located adjacent to the first and second openings in a plan view,
   third and fourth magnets of the four attaching magnets are respectively located adjacent to the third and fourth openings in the plan view, and
   the first, second, third, and fourth elastic members completely overlap the sensor unit in the plan view.

2. The inertial measurement unit according to claim 1, wherein each of the first substrate and the second substrate has a modulus of elasticity that is lower than a modulus of elasticity of each of the first elastic member, the second elastic member, the third elastic member, and the fourth elastic member.

3. The inertial measurement unit according to claim 1, wherein each of the first substrate and the second substrate is formed of a metal or a ceramic.

4. The inertial measurement unit according to claim 1, wherein the first and second magnets and the first and second openings are on a first straight line in the plan view,
   the third and fourth magnets and the third and fourth openings are on a second straight line in the plan view, and
   the first straight line is parallel to the second straight line.

5. The inertial measurement unit according to claim 2, wherein the first and second magnets and the first and second openings are on a first straight line in the plan view,
   the third and fourth magnets and the third and fourth openings are on a second straight line in the plan view, and
   the first straight line is parallel to the second straight line.

6. The inertial measurement unit according to claim 1, further comprising:
   a cable, an end of the cable being coupled to the sensor unit;
   a support substrate to which the cable is fixed;
   a third substrate disposed below the support substrate, a top surface of the third substrate facing a bottom surface of the support substrate, the third substrate having a second plurality of openings therein;
   a second plurality of spacers located at an outermost periphery of the top surface of the third substrate and coupling the support substrate and the third substrate together;
   a fourth substrate disposed below the third substrate, a top surface of the fourth substrate facing a bottom surface of the third substrate;
   a fifth elastic member provided on both the top and bottom surfaces of the third substrate via a fifth opening of the second plurality of openings;
   a sixth elastic member provided on both the top and bottom surfaces of the third substrate via a sixth opening of the second plurality of openings;
   a fifth fixing member penetrating, pressing and fixing the third substrate and the fifth elastic member to the fourth substrate via the fifth opening; and
   a sixth fixing member penetrating, pressing and fixing the third substrate and the sixth elastic member to the fourth substrate via the sixth opening.

7. The inertial measurement unit according to claim 1, wherein the first elastic member and the second elastic member are located between two of the first plurality of spacers that are next to each other.

8. The inertial measurement unit according to claim 1,
wherein the second substrate has another plurality of openings,
another substrate disposed below the second substrate, a top surface of the another substrate facing a bottom surface of the second substrate;
another elastic member provided on both the top and bottom surfaces of the second substrate via an opening of the another plurality of openings;
an additional elastic member provided on both the top and bottom surfaces of the second substrate via another opening of the another plurality of openings;
another fixing member penetrating, pressing and fixing the second substrate and the another elastic member to the another substrate via the opening of the another plurality of openings; and
an additional fixing member penetrating, pressing and fixing the second substrate and the additional elastic member to the another substrate via the another opening of the plurality of openings.

9. The inertial measurement unit according to claim 1, further comprising a cover fixed to the second substrate and containing the sensor unit, the first substrate, the first plurality of spacers, the first, second, third, and fourth elastic members, and the first, second, third, and fourth fixing members.

* * * * *